No. 707,530. Patented Aug. 19, 1902.
W. C. WRIGHT.
STOCK TANK.
(Application filed Sept. 30, 1901. Renewed June 30, 1902.)
(No Model.)

Witnesses
T. P. Brett
Harry Ellis Chandler

Inventor
W. C. Wright,
By Chandler & Chandler
Attorneys

UNITED STATES PATENT OFFICE.

WAYNE C. WRIGHT, OF AMARILLO, TEXAS.

STOCK-TANK.

SPECIFICATION forming part of Letters Patent No. 707,530, dated August 19, 1902.

Application filed September 30, 1901. Renewed June 30, 1902. Serial No. 113,834. (No model.)

*To all whom it may concern:*

Be it known that I, WAYNE C. WRIGHT, a citizen of the United States, residing at Amarillo, in the county of Potter, State of Texas, have invented certain new and useful Improvements in Stock-Tanks; and I do hereby declare the following to be a full, clear, and exact description of the invention, such as will enable others skilled in the art to which it appertains to make and use the same.

This invention relates to stock-tanks; and it has for its object to provide a device of this nature having a reservoir connected therewith and supplied by a pump in such manner that the water from the pump will flow directly to the tank, the surplus passing to the reservoir, from which it is drawn to replenish the tank when the pump is not in operation.

Other objects and advantages of the invention have reference to details of structure, which will be understood from the following description.

Figure 1:
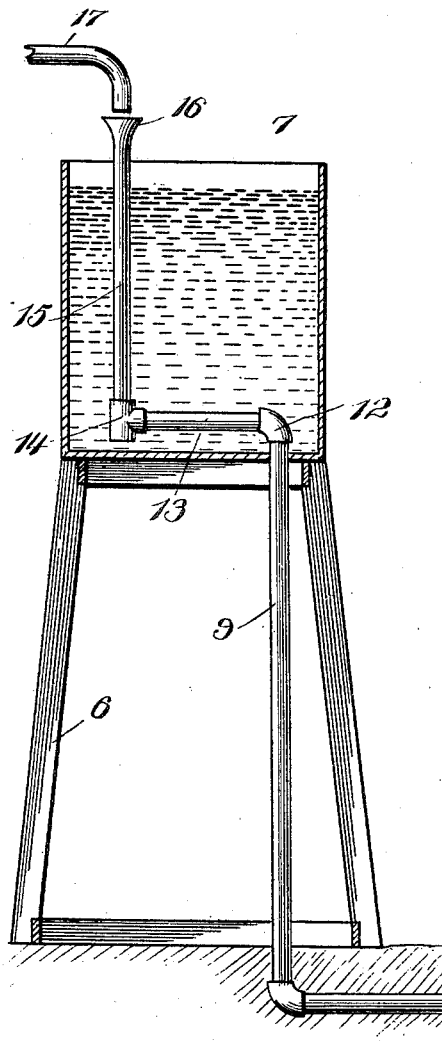
Figure 2:
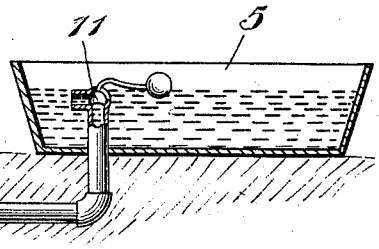

In the drawings forming a portion of this specification, and in which like numerals of reference indicate similar parts in the several views, Figure 1 is a view partly in section and partly in elevation and showing a construction embodying the present invention. Fig. 2 is a detail view showing the valve in the supply-pipe that communicates the pipe at times with the reservoir.

Referring now to the drawings, there is shown a tank 5, which is conveniently disposed for stock to drink therefrom, while at a suitable distance therefrom and supported upon a framework 6 is a reservoir 7, which may be of any desired shape and construction and have any desired capacity. Leading from the reservoir 7 is a pipe 9, which is passed upwardly through the bottom of the reservoir and which pipe below the reservoir is taken downwardly and into the ground and then laterally and then upwardly through the bottom of the tank 5 and terminates in a float-valve mechanism 11 at a point below the upper edge of the tank. The float-valve mechanism is designed to open the pipe when the water in the tank has dropped to a predetermined level and to close the pipe when the water that has run therefrom has raised the level of the water in the tank to its former height. Thus under any circumstances water will feed from the pipe to the tank only when the normal level of the water in the tank has been reduced.

Connected with the upper end of the pipe 9 within the reservoir and by means of the elbow 12 is a pipe 13, which extends laterally of the tank and has a T 14 connected to its end and which is turned upwardly for engagement therewith of the pipe 15, which extends vertically to a point above the upper edge of the reservoir and terminates in the funnel 16, to which leads the discharge-pipe 17 from a pump operated by a windmill or in any other suitable manner. In the under side of the T 14 is an opening 18, at the upper edge of which is formed the valve-seat 19, for which is provided the upwardly-opening valve 20, which when lowered closes communication between the pipe and reservoir and when raised opens communication, so that water may flow from the reservoir to the tank.

The operation of this apparatus is as follows: The pump being in operation water is fed to the pipe 15 and flows therethrough into the connected pipes and thence to the tank 5, the float-valve being open, and this flow continues until the float-valve is raised and cuts off the flow of water. The pressure of water in the pipe 15 holds the valve 20 closed, so that no water runs from the reservoir, and thus there is fed water direct from the pump to the tank, this water being palatable to the stock in summer, because of being cooler than water from the reservoir, and being also more palatable in winter, because that it is warmer than the water from the reservoir. When the float-valve closes, if the pump continues to operate the water flows over the edge of the funnel and into the reservoir. Supposing that the pump be stopped and water be drawn from the tank to open the float-valve, then the water in the pipe 15 will sink until its pressure above the valve 20 will be less than the pressure of the water in the reservoir against the under side of the valve, when the valve will open and water from the reservoir will feed to the tank. Thus the reservoir is brought into play to fill the tank only when the pump is not in operation.

In practice modifications of the specific construction shown may be made and any suitable materials and proportions may be used for the various parts without departing from the spirit of the invention.

What is claimed is—

1. In a device of the class described, the combination of a tank, a reservoir, a pipe connected with the tank and extending through the reservoir, said pipe having an opening leading from the reservoir, an inwardly-opening valve for the opening, and means for supplying water to the pipe above the valve.

2. In a device of the class described, the combination with a tank, of a reservoir, a pipe connected with the tank and leading upwardly through the reservoir, a float-valve mechanism for the pipe in the tank for controlling the passage of water from the pipe to the tank, an opening in the pipe communicating with the reservoir and having an inwardly-opening valve, said pipe extending above the water-level of the reservoir and having a flared upper end, and a supply-pipe leading to the flared end.

In testimony whereof I affix my signature in presence of two witnesses.

WAYNE C. WRIGHT.

Witnesses:
GEO. H. CHANDLEE,
FRANK D. BLACKISTONE.